Nov. 20, 1956       B. VER NOOY       2,771,096
FLUID TIGHT CLOSURE

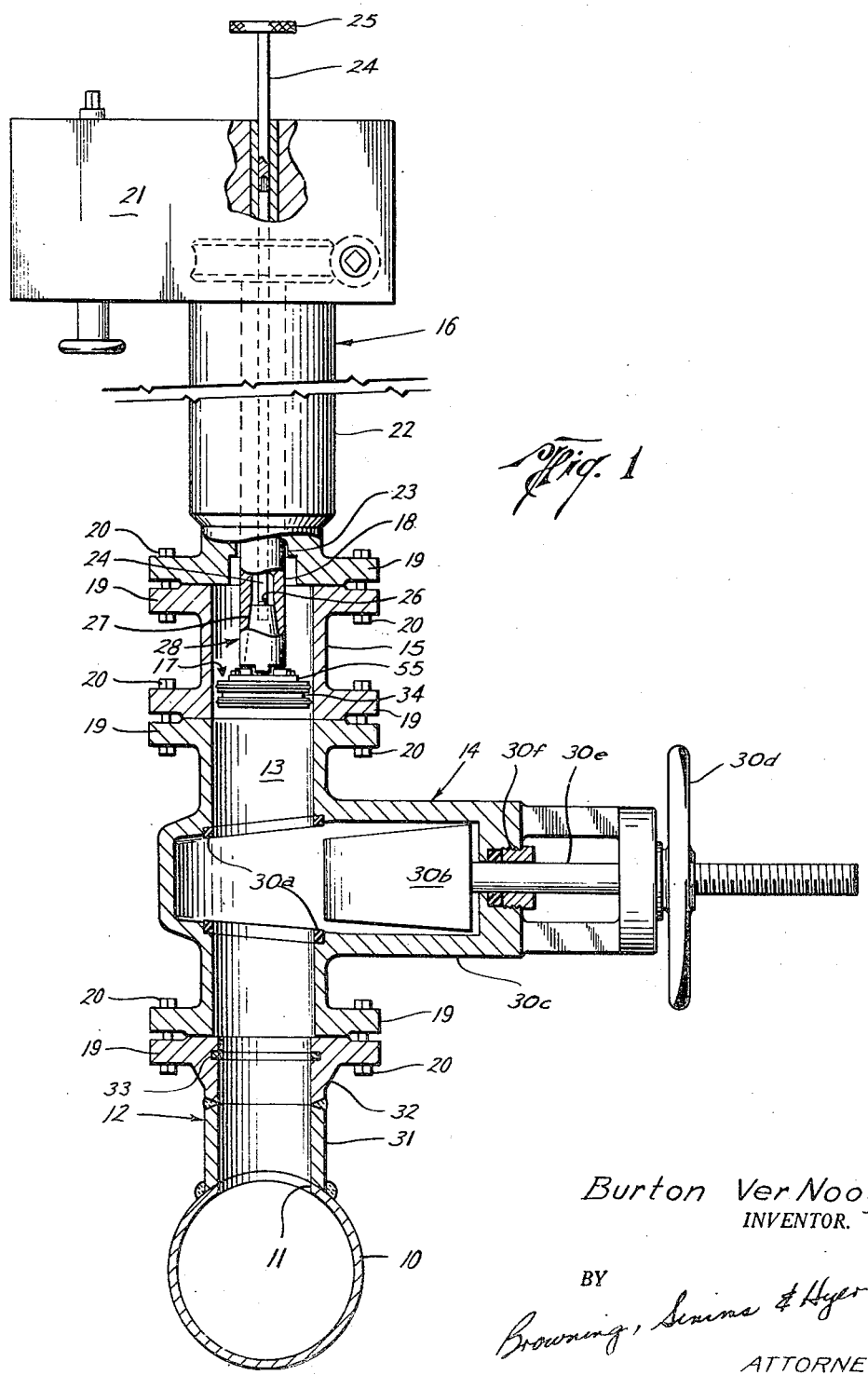

Filed May 5, 1954                3 Sheets-Sheet 3

Burton Ver Nooy
INVENTOR.

BY
Browning, Simms & Hyer
ATTORNEYS

United States Patent Office 2,771,096
Patented Nov. 20, 1956

2,771,096

FLUID TIGHT CLOSURE

Burton Ver Nooy, Tulsa, Okla., assignor to T. D. Williamson, Inc., Tulsa, Okla., a corporation of Oklahoma Application May 5, 1954, Serial No. 427,700

18 Claims. (Cl. 138—89)

This invention relates to improved apparatus for forming a fluid tight closure between connecting pressure vessels. In one of its aspects, it finds particular utility in the pipeline industry wherein it may be desired to provide access to the interior of the line and then seal the same closed, without a substantial loss of pressure from the line.

In the pipeline industry, it is frequently necessary to insert tools into the line. When the line is in use with fluids contained therein under high pressure, the insertion of such tools presents a particular problem. It is the practice to mount suitable apparatus on the line at the desired point of insertion for the purpose of (1) boring a hole through the pipeline wall to provide an outlet therefrom, (2) inserting the above-mentioned tool into the line through the hole, and (3) subsequently closing the outlet, all of these operations being performed with little or no loss of pressure from the line.

One method of performing the above operation involves mounting upon the line, in the order named and in superimposed relation, a pipe nipple or stub, a block valve, and a boring machine. When properly assembled, the machine and valve provide an enclosed fluid tight chamber or vessel on the line which enables a boring bar to be run from the machine through the valve and pipe stub to drill a hole in the portion of the line enclosed by the stub, thereby establishing a connecting conduit between the chambers of the pipeline and the boring apparatus. Upon removal of the boring bar and closing of the intermediate block valve, a suitable tool inserting device may be assembled with the boring apparatus and the tool run into the line through the just drilled hole. At this time, the boring machine may again be brought into operation for the purpose of closing and sealing tight the connecting conduit, whereby the valve and boring machine may be removed from the line. More specifically, a body or plug is mounted on the boring bar and run into the pipe stub for fluid tight sealing and locking therewith. At this time, the valve and boring machine may be removed from the line. The above-described operation, as well as particular apparatus for performing the same, is illustrated in the Instruction Manual for the "Hillco Tapping Machine" of T. D. Williamson, Inc.

Openings through the line have been closed by locking a plug within the pipe stub by screw threads, a fluid tight seal being obtained by the final seating of tapered threads. However, the torque required to turn the plug was found to be excessive. Also, it was found that welding of the conduit or pipe stub to the line often resulted in warpage which interfered with threading of the plug into the conduit. Still further, it will be understood that a threaded inner periphery on the stub or conduit necessarily reduces the size of tool which may be run through any given conduit, such that with increased thread sizes there is a sacrifice of conduit adaptability. This limitation poses a particular problem when the size of the tool to be inserted within the line approximates that of the inner diameter of the pipeline itself.

For the purpose of providing a more easily insertable means of locking the plug in the conduit and at the same time providing maximum adaptability for the conduit, it is proposed to use a substantially uniformly cylindrical plug which is adapted to be first inserted within a similarly constructed conduit and then locked by inserts or similar means bridging complementary recesses between the plug and conduit. Locking mechanisms of this type do not, however, provide fluid tight seals between the plug and conduit and, therefore, necessitate the use of separate sealing means therebetween.

It will be understood that such sealing means between the plug and conduit would be rendered operative prior to the time at which the plug is inserted within the conduit to a position enabling installation of the locking inserts. Thus, in the installation of a plug within a conduit connecting pressure vessels, wherein the pressure in the vessels is sufficiently high, it will also be appreciated that even a small amount of movement of the plug from its initially sealed toward its locking position will create a pressure differential thereacross of a magnitude sufficient to prevent its movement to locking position. For example, in actual pipeline installations, it has been found that with a plug member of less than 12 inches in diameter, only a fraction of an inch of sealed movement will create a pressure differential of 100 p. s. i. and consequently a load on the plug of approximately five tons.

It is a primary object of this invention to provide a closure device which will obviate the aforementioned difficulties.

Another object is to provide improved means especially well adapted for closing in fluid tight relation a connecting conduit between pressure vessels.

Another object is to provide apparatus for use in sealably closing a relatively large outlet from a pipeline or similar vessel containing fluid under high pressure, without substantial loss of pressure from the line.

Still another object is to provide a conduit and plug cooperable with one another in an improved manner to form a fluid tight closure between pressure vessels connected by the conduit.

Still another object is to provide a closure member adapted to be inserted into a relatively large conduit connecting one pressure vessel with another for the purpose of locking the member in fluid tight sealed relation within the conduit.

Yet another object is to provide, in combination, a conduit for connecting pressure vessels and a body adapted to be inserted in the conduit for closing the same, together with means for forming a fluid tight seal between the conduit and body during insertion of the latter but permitting positioning of the body in the conduit for locking one to the other subsequent to forming the seal therebetween.

Yet another object is to provide, in combination with the elements described in the foregoing object, means for guiding the body from one vessel toward the other during insertion thereof into the conduit, wherein such means is cooperative with the body to permit the aforesaid positioning for locking.

Yet another object is to provide apparatus, including a connecting conduit and a plug adapted to be locked therein, for forming a fluid tight closure between pressure vessels, said apparatus including a novel bypass valve arrangement which communicates the connecting vessels, whereby the plug may be inserted into the conduit to establish a fluid tight seal therewith and then moved in sealed relation within the conduit to a position to be locked therein.

A still further object of this invention is to provide apparatus of the type described in the foregoing object, in which the bypass valve arrangement may be actuated from externally the vessels to establish the aforesaid communication between connecting vessels during sealed movement of the plug but to prevent said communication upon positioning of the plug in locking position.

In the drawings, wherein like reference characters are used throughout to designate like parts:

Fig. 1 is an elevational view, partly in section, of a pipeline with a hole bored therein and a boring machine mounted on the line over the hole, with the appartus of the present invention in position to be inserted within a pipe stub connecting the pipeline and machine for closing the hole;

Figure 3:
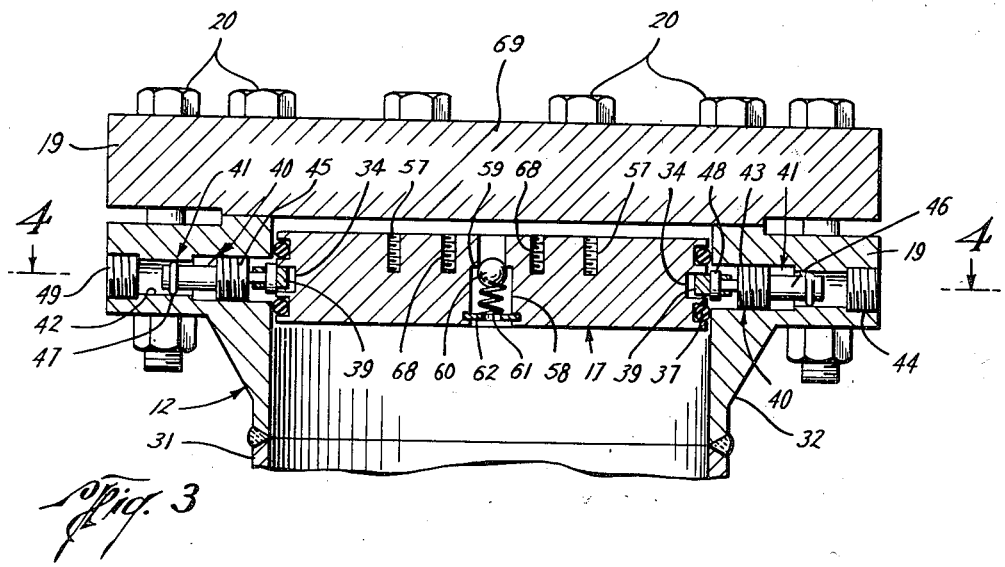
Fig. 3 is a view similar to Fig. 2 in which the plug has been locked within the stub, the boring machine and valve removed, and a blind flange installed over the plug and stub.

The novel closure apparatus of the present invention includes a conduit for connecting pressure vessels and a plug or body insertable into the conduit from one vessel toward another to a position whereby the body may be permanently locked therein. Accordingly, the conduit and body are provided with complementary locking recesses which are disposable opposite one another to receive locking inserts bridging the same. As well, the device includes means which forms a fluid tight seal between the body and conduit when so locked and a bypass valve arrangement adapted to establish communication between the connecting vessels when the seal is first established as the body is initially inserted within the conduit and the body is further inserted in sealed relation thereto to the position for permanently locking the body within the conduit.

According to a further novel aspect of this invention, the bypass valve arrangement is selectively operable from without the vessels whereby communication between connected vessels is permitted during sealed movement of the body in the conduit but is prevented when the plug is moved to locking position within the conduit. Still further, according to a preferred construction, the bypass valve is disposed in the body and is arranged so as to be actuated by a holder attachable to the body and movable within one of the vessels for guiding the body into the conduit.

Referring now particularly to the drawings, there is shown in Fig. 1 a pipeline 10 adapted to transport fluids under pressure and a hole 11 through the wall of the line. Welded to the line and surrounding the hole 11 is a pipe stub or nipple 12 which forms a conduit connecting the interior of the line and a chamber or vessel 13 which is defined by the passages through a valve 14 mounted on the stub and a reducing nipple 15 on the valve, and the lower end of a boring machine 16 mounted on the nipple. As shown, the chamber 13 is elongate and cylindrical and permits movement of a closure plug or body 17 longitudinally thereof into locking position within the conduit 12. Sealably movable longitudinally within the boring machine 16 is a bar 18 to which the plug 17 is attached for guided insertion through the chamber 13 and into the conduit. The conduit, valve, reducing nipple, and boring machine are each provided with flanged ends 19 adapted to be bolted together as at 20 to form a seal therebetween. Thus, the chamber 13 is at least substantially fluid tight and, in the position of Fig. 1 prior to locking of the plug within the conduit, the pressure within this chamber will assume that of the vessel defined by the interior of the pipeline 10.

As previously mentioned, suitable apparatus such as the boring machine 16, may be used to drill the opening 11, insert a tool or the like through the opening and into the line, and subsequently move the plug 17 to locking position within the conduit 12 to sealably close the same, all of the above operations being performable without a substantial loss of pressure from the line. Certain of the details of a preferred machine of this type are shown in Fig. 1, although, for a more complete description of the same, reference is had to the aforementioned Instruction Manual for the "Hillco Tapping Machine."

Referring, however, to those parts of the machine most pertinent to the present invention, it can be seen that it comprises an upper compartment 21 which houses the drive mechanism for rotatably driving the boring bar 18 and a depending sleeve 22 having a bore 23 therethrough which sealably surrounds and guides the bar for longitudinal and rotary movement.

Figure 2:
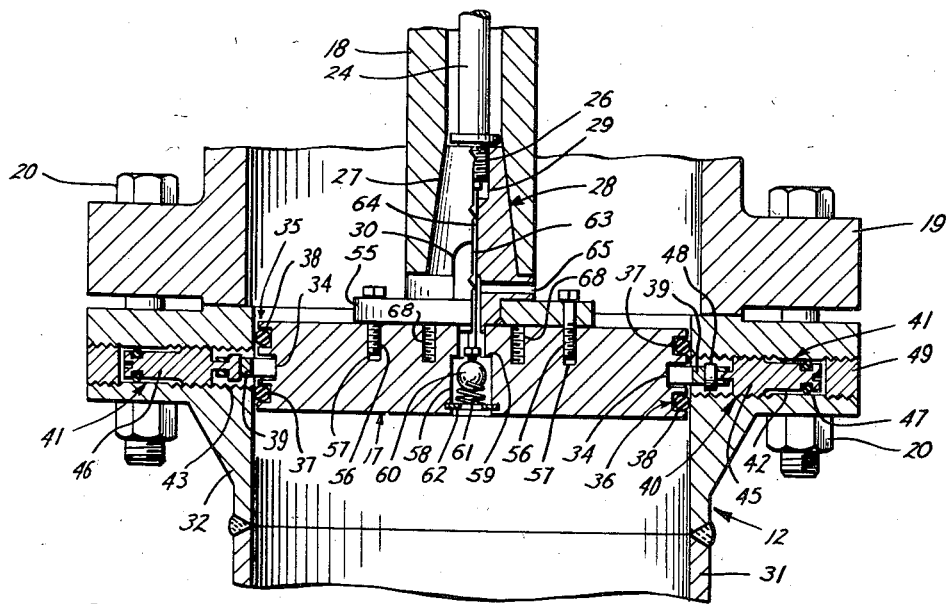
Fig. 2 is an enlarged sectional view of the pipe stub and plug as the latter is inserted into position to be locked within the stub.

Extending through a central passage in the bar is a retainer rod 24 having an actuating handle 25 at its upper end above the compartment 21 and a threaded shank 26 at its opposite lower end which, as shown in Figs. 1 and 2, is adapted to be extended into the lower conically flared end 27 of boring bar 18. The threaded shank 26 and flared end 27 thus cooperate to provide a means of attachment for a tool or other suitable member, such as a plug holder 28. As shown, the holder is conically tapered to fit within the boring bar end 27 and is provided with a bore 29 threaded at its upper end for connection with rod shank 26. It will be understood that upon turning of the rod 24 within the bar, the plug holder would be tightly secured to the bar. On the other hand, loosening of the threaded connection will permit easy detaching of the holder. The inner edge of the flared end 27 of the bar is also provided with keys (not shown) adapted to be received in slots, such as slot 30 (Fig. 2) in the holder 28, to prevent relative rotation between the boring bar and the lowered tool attached thereto.

The valve 14 is provided with seating surfaces 30a upon which valve member 30b is adapted to be seated. The valve member is operated between seated or closed and unseated or fully opened position, as shown in Fig. 1 wherein member 30b is received in lateral housing 30c, by a crank 30d which actuates threaded valve stem 30e sealably slidably in gland 30f.

Although not shown, it is the practice in the industry to attach a bit to the end of a boring bar such as 18, in a manner similar to the manner in which plug holder 28 is attached thereto, open the valve 14, and then extend the bar down through the valve and the conduit 12 whereby the hole 11 may be drilled by the bit upon lowering and rotating of the bar. Then, upon drilling of the hole, the bar may be raised to a position above the valve, the valve closed, and the bit replaced on the end of the bar with the particular tool to be inserted within the line. Upon reassembly of the boring machine with the valve, the valve may be again opened, the tool run into the pipeline, detached from the bar, and the bar again raised above the valve. A similar procedure is followed in attaching the plug 17 to the bar, as shown in Figs. 1 and 2. Upon reopening of the valve 14, the plug is ready for insertion into and locking with the conduit 12.

The conduit or pipe stub 12 comprises a lower nipple portion 31 welded to the pipeline about the hole 11 and an upper section 32 welded to the nipple 31 and carrying the flange 19 for bolting to the valve 14. This upper section 32 is also provided with a locking recess 33 about its inner periphery, cooperable with the plug or body 17 in a manner to be described, such that it actually receives the body when locked therein (Figs. 2 and 3). However, it will be understood that the conduit need not be formed of separate sections. For that matter, as used in the claims and as will be obvious from this description, the term "conduit" is broad enough to include, for example, that portion of the wall of one of the vessels through which an opening extends to connect one vessel with the other.

The plug or body 17 is cylindrical in shape to conform to the chamber 13 and is provided with an annular recess 34 about its periphery which is adapted to be positioned opposite the recess 33 in conduit 12 to permit a locking means to be disposed therebetween to lock the plug within the conduit. Also disposed peripherally of the plug are seal means 35 and 36 at opposite sides of the recess and arranged, when the recesses 33 and 34 are in locking position opposite one another, to not only seal the chamber 13 from the pipeline 10 but also to seal each of the above from the recesses. These seal means are preferably in the form of O-rings 37 received in annular recesses 38.

Figure 4:
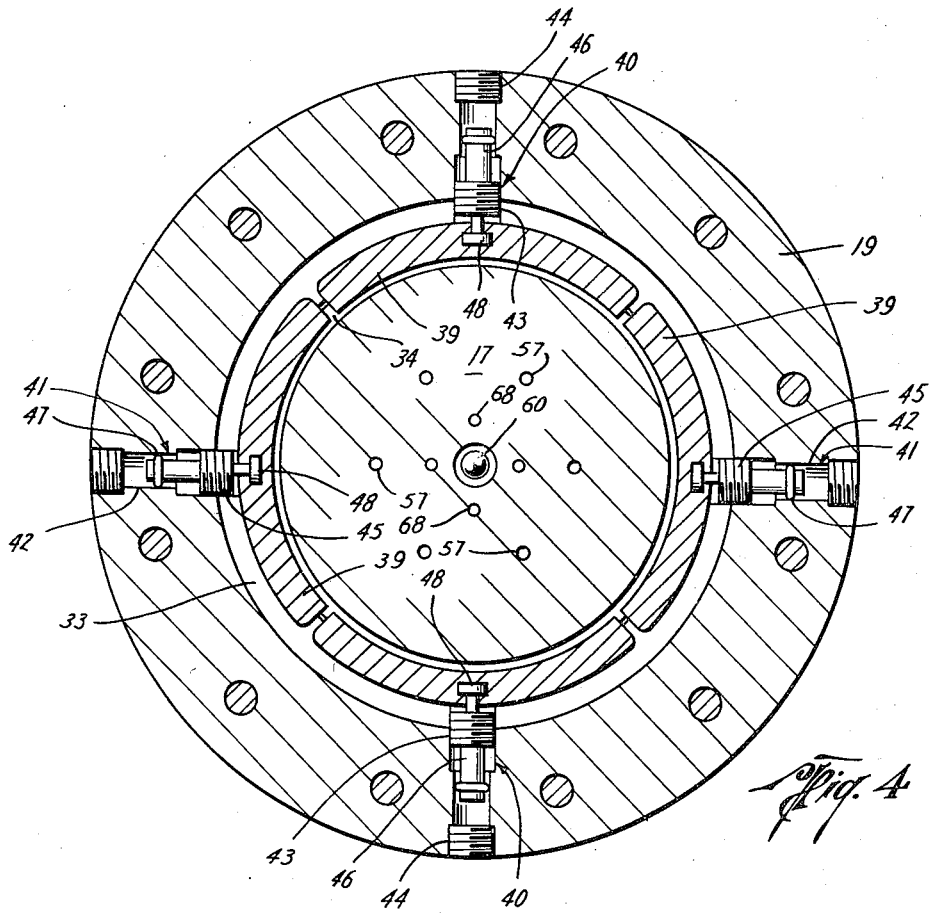
Fig. 4 is a cross-sectional view of the stub and plug locked to one another, and taken substantially along broken line 4—4.

The preferred form of locking means is shown in Figs. 2 to 4 and comprises a series of arcuate plates or inserts 39 adapted to be moved in the recesses 33 and 34 radially of the plug 17. As shown in Fig. 2, the inserts are wholly disposed within the recess 33 of conduit 12 and thus do not lock the plug within the conduit. However, in Fig. 3 the inserts 39 have been moved radially inwardly to bridge the space between the recesses and thus lock the plug in the conduit. In the latter position, the ends of the inserts are almost adjacent one another and substantially surround the recess 33. Individual radial movement for each of the inserts is provided by a feed screw 40 threadedly received in a radially extending passage 41 between the recess 33 of the conduit and the conduit exterior.

Each of the passages 41 includes a uniformly cylindrical central section 42 and enlarged inner and outer threaded sections 43 and 44, respectively, at opposite ends thereof. Each feed screw 40 includes an inner end 45 threadedly received and movable in passage section 43 and a reduced outer end 46 adapted to move longitudinally within central passage section 42 and carrying an O-ring seal 47 annularly thereof for sliding sealed engagement with the section 42. As can be seen from the drawings, the limits of movement of the feed screw are such as to always maintain O-ring 47 within section 42.

The inner end 45 of the screw is provided with a T-shaped stem 48 for coupling with a complementary slot in its respective insert 39. The outer end 46 is adapted to be engaged by a suitable tool for feeding the screw 40 into or retracting it from locking position in the passage 41. When the screw is not being fed, the outer section 44 of the passage is closed tight with a threaded plug 49. It will be understood from the foregoing that additional provision is made to prevent leakage through the passage out of either the chamber 13 or the pipeline 10.

Figure 5:
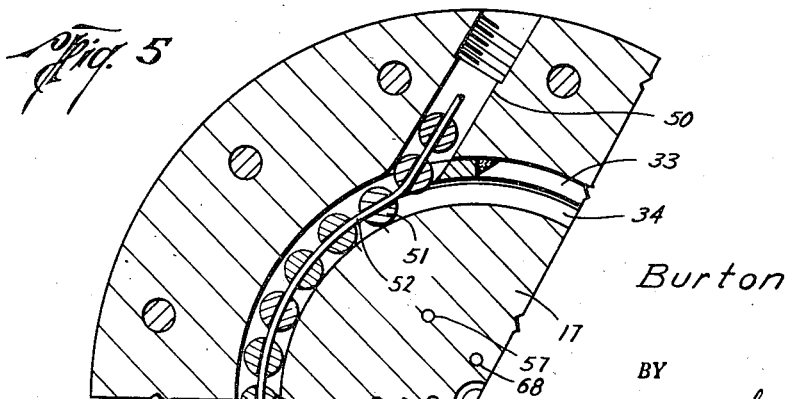
Fig. 5 is a partial cross-sectional view of the plug and stub similar to Fig. 4 with modified locking means therebetween.

A modified form of locking means is illustrated in Fig. 5 and comprises a flexible member insertable within the recesses through an angularly extending passage 50 connecting the recess 33 with the conduit exterior. The flexible member is of a cross-sectional dimension sufficient to at all times bridge between the recesses and may comprise, as shown in Fig. 5, for example, a series of closely grouped hard metal balls 51, either with or without a cable 52. It is contemplated that a relatively strong coil spring or a cable or the like can be substituted for the ball arrangement. Upon opposite disposition of the recesses 33 and 34, the flexible member may be forced within the passage 50 and caused to move circumferentially of the body to substantially surround the same. The outer end of the passage is threaded to receive a threaded plug (not shown) to close the same at all times except during insertion and removal of the flexible means.

The plug holder 28 is provided with a flange plate 55 at its lower end which receives screws 56 (Fig. 2) for attachment with the outer ring of threaded sockets 57 in plug 17. Thus, the attached plug is lowered on the bar 18 through the chamber 13 and into the conduit 12.

In moving through the chamber, it can be seen from Fig. 1 that the seal means on the plug do not engage and seal with the walls thereof. Thus, during this movement, little or no pressure differential is built up across the plug. However, as the plug first moves into the conduit, the seal means 36 thereon engages the inner periphery of the smaller diameter conduit and seals therebetween. As previously mentioned and as will now be more fully understood, continued insertion of the plug in sealed relation to the conduit will, due to the increasing size of the sealed chamber 13, result in a pressure differential across the plug. With many installations, unless this differential is relieved, it will become extremely difficult, if not impossible, to fully insert the plug to its locking position.

One procedure for relieving this reduced pressure within the chamber 13 would be to vent the same to atmosphere. However, such is not practical when the fluid within the pipeline or other pressure vessel is under high pressure, such as 100 p. s. i. Thus, in accordance with the present invention, it is preferred to vent the chamber 13 to the pipeline 10 and thus permit them to assume substantially the same pressure during insertion of the plug within the conduit 12. Although this venting might be accomplished by the provision of an outside bypass line between the pipeline and chamber, and such an arrangement is within the realm of this invention, the added equipment required makes this a less preferred arrangement. As shown in the drawings, it is preferred to provide a novel bypass valve means through the plug 17 itself. Although a bypass could alternatively be provided through the conduit 12, it would not be so easily adaptable to the novel arrangement described below in which the bypass valve is operable by means of the holder and guide for the plug.

Turning now to the preferred bypass valve arrangement shown in the drawings, the plug 17 is provided with a passage 58 extending centrally therethrough and a valve seat 59 intermediate the ends or the passage. A ball valve member 60 is adapted to be seated (Fig. 3) upon the seat 59 to close the passage 58 but is movable away therefrom (Fig. 2) to open said passage. A coil spring 61 is retained between the valve member and an annular ring 62 in the passage to normally urge the member to closed position. As can be seen, the passage is opened upon movement of the valve member 60 in the direction of inserting movement of the plug 17, or, in other words, away from the chamber 13 through which the plug is moved.

A depending prong or actuator 63 extends slidably through a reduced section 64 of the bore 29 through plug holder 28. As shown in Fig. 2, this prong is of such length that when the plug holder is threaded onto the end 26 of the retainer rod in secured position, the end of the prong is forced down below the holder and flange plate 55 and into the passage 58 to unseat valve member 60. Thus, it will be understood that as the plug 17 is lowered by the boring bar 18 through the passage 13 and into the conduit 12, the bypass valve is open. By means of radial vent 65 through the plug holder 28 which communicates bore section 64 and chamber 13, the pressures within the chamber and the pipeline will equalize and prevent pressure differential across the plug. In the sense used above then, when employed for inserting the plug within the conduit, the boring bar 18, along with its prong 63 and the plug holder 28, comprises a holder means cooperable with the bypass valve to hold the same open when the holder is attached to the plug.

When, however, the plug 17 is inserted to the position of Figs. 2 and 3 and locked in place, the retainer rod 24 may be turned to retract the prong 63 and permit the valve member 60 to be urged to seated position. With the pipeline thus sealed off from the chamber 13, the separate upper section of the retainer rod 24 (see Fig. 1) may be lifted out and the entire assembly above the flange 19 of upper section 32 removed. The screws 56 attaching the plate 55 to the plug may then be released and the plug holder 28 and plate removed. Threaded sockets 68 may be provided for attaching a smaller plug holder to the plug. A blind flange 69 is placed over the plug and bolted about its periphery to the flange 19 on the conduit 12. Thus, the plug and its parts are not only protected but added assurance of sealing of the conduit is provided. At the same time, pressure which may be built up within the space between the flange and plug due, for instance, to the heat of the sun on the flange will be relieved automatically by opening of the bypass valve.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A fluid tight closure for a connecting conduit between pressure vessels, wherein the conduit is provided with locking means, said closure comprising a body insertable from one of the vessels into a locked position within the conduit, locking means on the body for cooperation with the conduit locking means in said locked position, seal means about the body and positioned relative to the locking means for sealing engagement with the conduit during insertion of the body into locked position, and bypass valve means in the body adapted to be opened to permit communication between said vessels during insertion of the body and to be closed after said insertion to prevent said communication.

2. A fluid tight closure for a connecting conduit between pressure chambers, in which the conduit is provided with a locking recess in its inner periphery, said closure comprising, a body insertable from one of the chambers into the conduit, seal means about the periphery of the body for fluid tight engagement with the conduit as the body is inserted therein, a locking recess on the periphery of the body adapted to be positioned opposite the recess in the conduit to accommodate locking means therebetween, a bypass through the body providing fluid communication between the chambers when the seal means is in fluid tight engagement with the conduit, and valve means in the bypass normally closing the same but adapted to be opened during insertion of the body, whereby pressure within the chamber from which the body is inserted may be relieved as the seal means establishes fluid tight engagement with the conduit and the body is further inserted within the conduit for positioning the recesses of the body and conduit opposite one another.

3. A closure of the character defined in claim 2, in which the valve means comprises, a valve seat in the bypass and a valve member urged toward seating engagement with the valve seat to close the bypass but movable away therefrom in the direction of movement of the body during insertion thereof for opening the bypass.

4. A closure of the character defined in claim 3, wherein spring means are provided within the bypass for urging the valve member into seating engagement with the valve seat.

5. A closure of the character defined in claim 3, in which the portion of the bypass communicating with the chamber away from which the body is moved during insertion comprises a passage between the valve seat and the exterior of the body radially inwardly of the periphery thereof.

6. Apparatus for forming a fluid tight closure between pressure chambers, comprising, a conduit adapted to connect the chambers, a plug insertable from one of the chambers into the conduit, a locking recess in each of the inner and outer peripheries of the conduit and plug, respectively, adapted to be disposed opposite one another upon insertion of the plug, locking means for disposal in the recesses, means between the inner and outer peripheries which provides a fluid tight seal between the conduit and plug during insertion of the latter, and bypass valve means adapted to provide fluid communication between opposite sides of the seal means upon fluid tight engagement thereof between the conduit and plug during insertion of the plug, whereby pressure within the chamber from which the body is inserted may be relieved to permit insertion of the plug into position to oppositely dispose the conduit and plug recesses.

7. Apparatus of the character defined in claim 6, including passage means communicating the locking recess of the conduit with the exterior of the conduit for installing the locking means in locking relation between the recesses when disposed opposite one another.

8. Apparatus of the character defined in claim 7, in which the locking means comprises a series of plates, and including means in the passage means for moving the plates radially with respect to the plug.

9. Apparatus of the character defined in claim 7, the locking means including flexible means insertable through the passage means and movable circumferentially of the body within the recesses to locking position.

10. Apparatus for forming a fluid tight closure within a conduit connecting pressure chambers, in which the conduit is provided with a locking recess in its inner periphery, said apparatus comprising, a plug insertable from one of the chambers into the conduit, a locking recess in the outer periphery of the plug for disposal opposite the locking recess in the conduit upon insertion of the plug, locking means for disposal in the recesses when opposite one another, means on the outer periphery of the plug which provides a fluid tight seal between the conduit and plug during insertion of the latter, bypass valve means in the plug adapted to provide fluid communication between opposite sides of the seal means upon fluid tight engagement thereof between the conduit and plug during insertion of the plug, whereby pressure within the chamber from which the plug is inserted may be relieved to permit insertion of the plug into position to oppositely dispose the conduit and plug locking recesses, and holder means removably attachable to the plug for guiding the same through the chamber from which the plug is inserted into the conduit, said holder means including an actuator for opening the bypass valve means during insertion of the plug.

11. As in claim 10, the bypass valve means including a valve member urged toward seated position whereby, upon detachment of the holder means, the bypass valve means will be closed.

12. Apparatus of the character defined in claim 11, wherein the bypass valve means includes a passage for receiving the actuator when the holder means is attached to the plug and the valve member is positioned for unseating by the actuator when it is so received in the passage.

13. In combination, a substantially cylindrical conduit, a substantially cylindrical body adapted to be inserted within the conduit, a locking recess in the inner periphery of the conduit, a locking recess in the outer periphery of the body, said last-mentioned body recess being positionable opposite the conduit recess upon insertion of the body into the conduit, seal means around the outer periphery of the body at opposite sides of the body recess in position to sealingly engage the inner periphery of the conduit when the body is inserted within the conduit and the locking recesses are positioned opposite one another, lock means disposable in and adapted to bridge the recesses of the body and conduit when positioned opposite one another, a passage through the body providing communication between opposite ends thereof, a valve seat in the passage, a valve member adapted to be seated upon the valve seat but movable away therefrom to permit fluid communication through the passage, and spring means in the passage urging the valve member into seated position upon said valve seat to prevent fluid communication through the passage.

14. Apparatus for forming a fluid tight closure between pressure vessels, comprising a conduit adapted to connect the vessels, a plug insertable from one of the vessels into the conduit, complementary locking parts on the conduit and plug for locking said plug within the conduit, seal means between said conduit and plug for sealing engagement therebetween and positioned relative to said locking parts to establish said sealing engagement during insertion of the plug into locked position, and bypass valve means in the plug adapted to be opened to permit communication between the pressure vessels during insertion of the body and to be closed after said insertion to prevent said communication.

15. Apparatus of the character defined in claim 14, wherein the seal means comprises a sealing element carried about the periphery of the plug.

16. Apparatus for forming a fluid tight closure within a conduit connecting pressure vessels, wherein the conduit is provided with locking means, said apparatus comprising a body insertable from one of the vessels into a locked position within the conduit, locking means on the body for cooperation with the conduit locking means in said locked position, seal means between said conduit and plug for sealing engagement therebetween and positioned relative to said locking means to establish said sealing engagement during insertion of the plug into locked position, a bypass through the body, valve means for opening and closing said bypass, and holder means removably attachable to the body for inserting it into the conduit, said holder means including an actuator for said valve means to open the bypass and thereby permit communication between said pressure vessels during insertion of the body into locked position.

17. Apparatus of the character defined in claim 16, wherein the valve means includes a valve member normally urged to a position closing the bypass whereby, upon removal of the holder means, the bypass will be closed to prevent communication between said pressure vessels.

18. Apparatus of the character defined in claim 16, wherein the valve means includes a valve member resiliently urged to a position closing the bypass, and the actuator comprises a part movable relatively to the body when the holder means is attached thereto for urging the valve member to a position opening the bypass.

References Cited in the file of this patent

UNITED STATES PATENTS

| | | |
|---|---|---|
| 1,429,566 | Carlile | Sept. 19, 1922 |
| 1,659,478 | Black | Feb. 15, 1928 |
| 1,911,323 | Otis | May 30, 1933 |
| 1,958,273 | Hutt | May 8, 1934 |
| 2,436,407 | Stephens | Feb. 24, 1948 |
| 2,679,173 | Hill | May 25, 1954 |